US009751093B2

(12) United States Patent
Helm et al.

(10) Patent No.: US 9,751,093 B2
(45) Date of Patent: Sep. 5, 2017

(54) EFFLUENT TREATMENT SYSTEM

(71) Applicant: Cimarron Land & Cattle Company, LLC, Greeley, CO (US)

(72) Inventors: Richard E. Helm, Bainbridge Island, WA (US); Roger Kendall McGowan, Greeley, CO (US); Martin C. Helm, Greeley, CO (US)

(73) Assignee: Cimarron Land & Cattle Company, LLC, Greeley, CO (US)

( * ) Notice: Subject to any disclaimer, the term of this patent is extended or adjusted under 35 U.S.C. 154(b) by 0 days.

(21) Appl. No.: 14/885,322

(22) Filed: Oct. 16, 2015

(65) Prior Publication Data

US 2017/0106377 A1    Apr. 20, 2017

(51) Int. Cl.
*B03D 1/016* (2006.01)
*B01F 3/02* (2006.01)
*C02F 103/38* (2006.01)
*C02F 1/24* (2006.01)

(52) U.S. Cl.
CPC .............. B03D 1/016 (2013.01); *B01F 3/02* (2013.01); *B03D 2201/002* (2013.01); *C02F 1/24* (2013.01); *C02F 2103/38* (2013.01)

(58) Field of Classification Search
CPC ..... B01F 3/02; B03D 1/016; B03D 2201/002; C02F 1/24; C02F 2103/38
See application file for complete search history.

(56) References Cited

U.S. PATENT DOCUMENTS

| 3,975,269 | A | * | 8/1976 | Ramirez | .................. C02F 1/24 |
| | | | | | 205/756 |
| 4,603,156 | A | * | 7/1986 | Sortwell | ................... B01F 3/12 |
| | | | | | 523/324 |
| 4,640,622 | A | * | 2/1987 | Sortwell | ................. B01F 5/248 |
| | | | | | 366/156.1 |
| 4,933,087 | A | | 6/1990 | Markham, Jr. et al. | |
| 5,382,369 | A | * | 1/1995 | Vion | ...................... B01D 17/00 |
| | | | | | 210/702 |
| 5,407,975 | A | * | 4/1995 | Pardikes | ................... B01F 1/00 |
| | | | | | 523/322 |
| 5,413,720 | A | | 5/1995 | Miller | |
| 5,540,836 | A | * | 7/1996 | Coyne | ................ B01D 17/0205 |
| | | | | | 210/143 |
| 6,277,191 | B1 | * | 8/2001 | Budiansky | ............ C04B 24/023 |
| | | | | | 106/724 |
| 2011/0120955 | A1 | | 5/2011 | Wood | |
| 2014/0026977 | A1 | * | 1/2014 | Kimmerle | ................. B01F 3/02 |
| | | | | | 137/98 |

* cited by examiner

*Primary Examiner* — Michael A Salvitti
(74) *Attorney, Agent, or Firm* — Craig R. Miles; CR MILES P.C.

(57) ABSTRACT

A dispersion for use with an effluent treatment system, and methods of making and using such a dispersion, whereby the dispersion includes an amount of polymer substantially uniformly dispersed within an aqueous solvent; wherein the dispersion is generated by combining an amount of gas with the amount of polymer and the aqueous solvent, the amount of gas effective to substantially uniformly disperse the amount of polymer within the aqueous solvent.

20 Claims, 3 Drawing Sheets

EFFLUENT TREATMENT SYSTEM

SUMMARY OF THE INVENTION

A broad object of a particular embodiment of the invention can be to provide a dispersion for use with an effluent treatment system, and methods of making and using such a dispersion, whereby the dispersion includes an amount of polymer substantially uniformly dispersed within an aqueous solvent; wherein the dispersion is generated by combining an amount of gas with the amount of polymer and the aqueous solvent, the amount of gas effective to substantially uniformly disperse the amount of polymer within the aqueous solvent.

Another broad object of a particular embodiment of the invention can be to provide a method of recovering tallow from effluent, the method including providing a dispersion comprising an amount of polymer substantially uniformly dispersed within an aqueous solvent; and combining the dispersion with the effluent within a dissolved air flotation system to generate a float comprising solids, water, and a mixture of fats, oils, and greases.

Another broad object of a particular embodiment of the invention can be to provide the method of recovering tallow from effluent, the method further including separating the solids and the water from the mixture of fats, oils, and greases to provide the tallow.

Another broad object of a particular embodiment of the invention can be to provide a portable effluent treatment system for recovering tallow from effluent, the portable effluent treatment system including a mixing chamber in which a dispersion is generated, the dispersion comprising an amount of polymer substantially uniformly dispersed within an aqueous solvent; and a dissolved air flotation system in fluidic communication with the mixing chamber; wherein in the dissolved air flotation system, the dispersion is combined with the effluent to generate a float comprising solids, water, and a mixture of fats, oils, and greases.

Another broad object of a particular embodiment of the invention can be to provide a portable effluent treatment system for recovering tallow from effluent, the portable effluent treatment system further including a heater in fluidic communication with the dissolved air flotation system; wherein in the heater, the float is heated to provide heated float.

Another broad object of a particular embodiment of the invention can be to provide a portable effluent treatment system for recovering tallow from effluent, the portable effluent treatment system further including a separation system in fluidic communication with the heater; wherein in the separation system, the solids and the water are separated from the mixture of fats, oils, and greases to provide the tallow.

Naturally, further objects of the invention are disclosed throughout other areas of the specification, drawings, and claims.

DETAILED DESCRIPTION OF THE INVENTION

Figure 1:
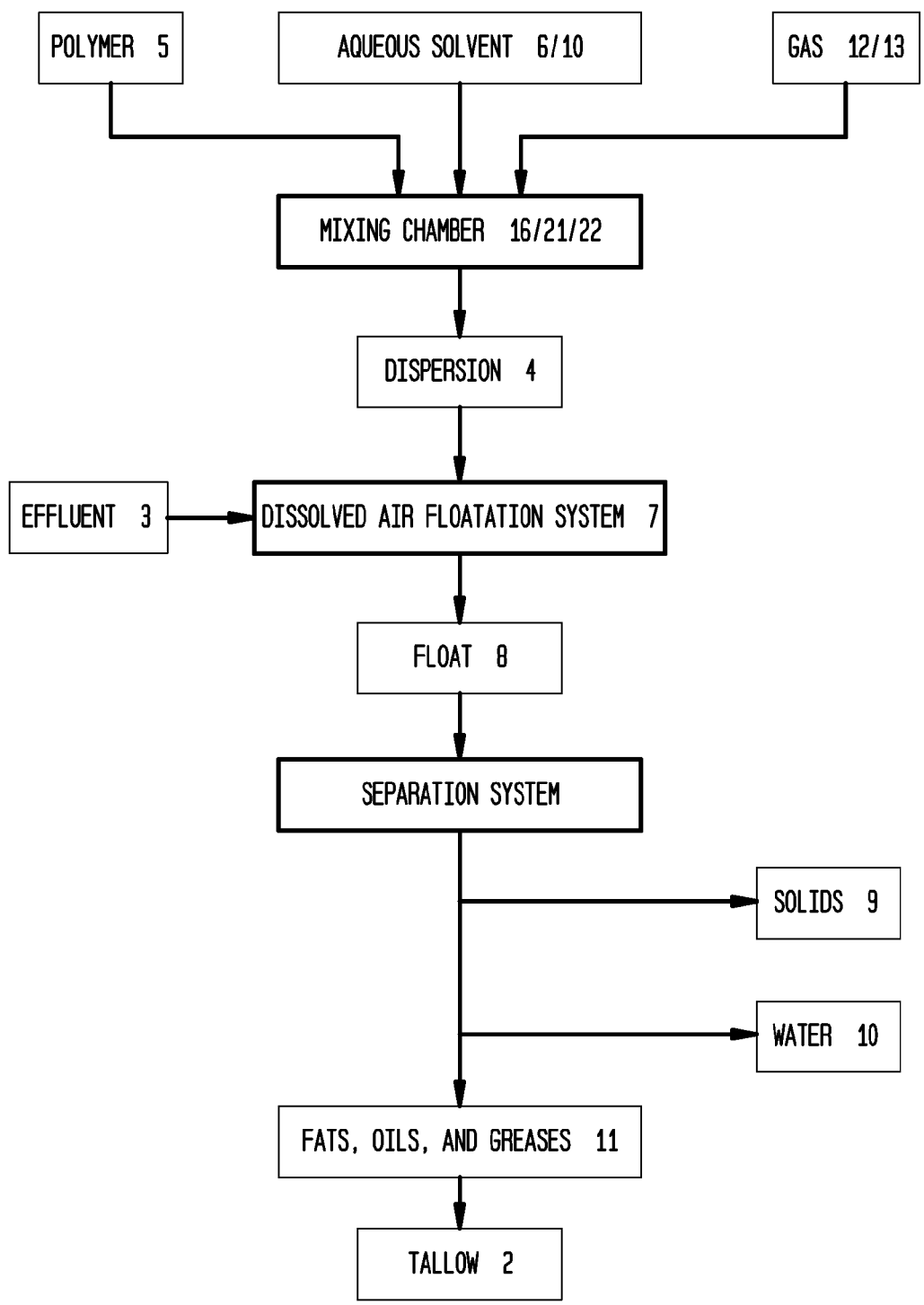
FIG. 1 is an illustration of a method of using a particular embodiment of the effluent treatment system to recover tallow from effluent.

Now referring primarily to FIG. 1, which illustrates a method of using a particular embodiment of the effluent treatment system (1) to recover tallow (2) from effluent (3), whereby the method generally includes providing a dispersion (4) comprising an amount of polymer (5) substantially uniformly dispersed within an aqueous solvent (6); combining the dispersion (4) and the effluent (3) within a dissolved air flotation system (7) to generate a float (8) comprising solids (9), water (10), and a mixture of fats, oils, and greases (11); and separating the solids (9) and the water (10) from the mixture of fats, oils, and greases (11) to provide the tallow (2).

For the purposes of the present invention, the term "effluent" means a flow of matter whereby typically, but not necessarily, the matter includes waste material.

For the purposes of the present invention, the term "tallow" means a rendered form of lipid material, which is typically derived from animal tissue. As but a few non-limiting examples, sources of animal tissue can include cattle, pigs, sheep, poultry, and seafood.

For the purposes of the present invention, the term "fats, oils, and greases" means lipid materials, which are typically derived from animal tissue. As to particular embodiments, fats can be generally solid at room temperature whereby oils and greases can be generally liquid at room temperature.

For the purposes of the present invention, the term "solids" means materials other than fats, oils, and greases which may be generally stable in shape and accordingly, may not be fluid in form, such as proteinaceous materials.

For the purposes of the present invention, the term "fluid" or "fluidic" means flowing or flowable; not solid.

For the purposes of the present invention, the term "uniform" means generally not varying or variable.

Figure 3:
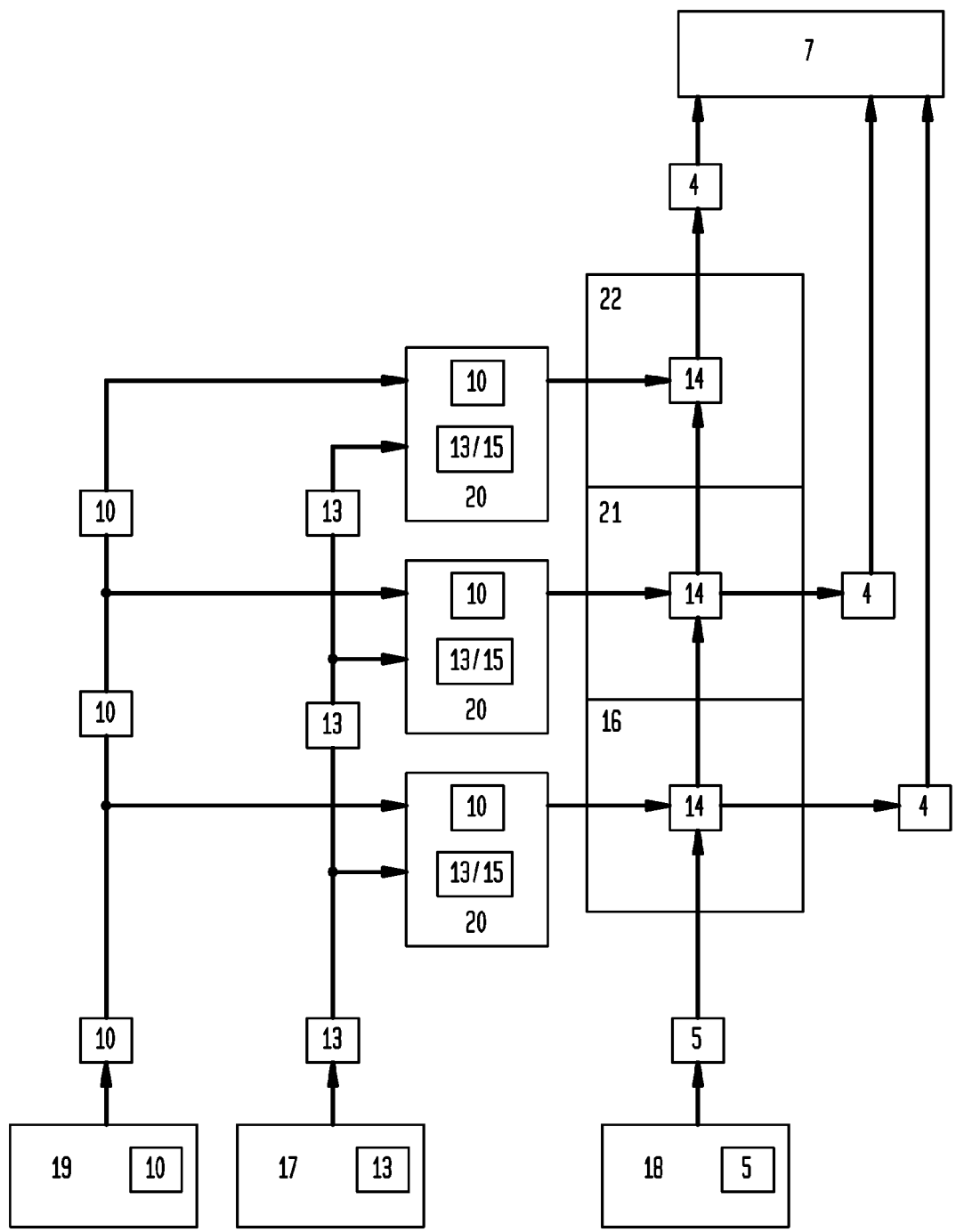
FIG. 3 is an illustration of a method of making a particular embodiment of a dispersion which can be used with the effluent treatment system.

Now referring primarily to FIG. 3, the effluent treatment system (1) utilizes a dispersion (4) to facilitate generation of a float (8) which comprises solids (9), water (10), and a mixture of fats, oils, and greases (11) within a dissolved air flotation system (7). The dispersion (4) includes an amount of polymer (5) which is substantially uniformly dispersed within an aqueous solvent (6), for example water (10), whereby the dispersion (4) is generated by combining an amount of gas (12), for example air (13), with the amount of polymer (5) and the aqueous solvent (6), whereby the amount of gas (12) is effective to substantially uniformly disperse the amount of polymer (5) within the aqueous solvent (6) to provide the dispersion (4).

The polymer (5) can be comprised of any of a numerous and wide variety of polymeric molecules, each formed from a plurality of subunits bonded together, which upon combination with the effluent (3) in the dissolved air flotation system (7), facilitate generation of the float (8) which comprises solids (9), water (10), and a mixture of fats, oils, and greases (11). As but one illustrative example, to generate the float (8), the polymer (5) can facilitate flocculation, agglomeration, coagulation, or the like, or combinations thereof, of components of the float (8).

As non-limiting examples, useful polymers (5) can include solution polymers, such as FLOPAM Product C-311, which can be obtained from SNF, Inc., 1 Chemical Plant Road, P.O. Box 250, Riceboro, Ga. 31323, USA; dispersion polymers, such as ULTIMER® Polymer, which can be obtained from Nalco, 1601 West Diehl Road, Naperville, Ill. 60563, USA; emulsion polymers, such as SEDIFLOC 104CP, which can obtained from Kemira Chemicals, Inc.; organic coagulants, such as POLYCHEMIE FL2949, which can be obtained from SNF, Inc., 1 Chemical Plant Road, P.O. Box 250, Riceboro, Ga. 31323, USA; and inorganic coagulants, such as ULTRAFLOC® 320HV, which can be obtained from GEO® Specialty Chemicals, 340 Mathers Road, Ambler, Pa. 19002, USA.

The amount of polymer (5) can be any amount which, upon combination with the effluent (3) in the dissolved air flotation system (7), can facilitate generation of the float (8) comprising solids (9), water (10), and a mixture of fats, oils, and greases (11). As to particular embodiments, the amount of polymer (5) can be tailored to the effluent (3), whereby a lesser or greater amount of polymer (5) can be included in the dispersion (4) based upon the amount of one or more components in the effluent (3) to facilitate generation of the float (8).

As but one illustrative example, polymer (5) can be included in the dispersion (4) in an amount ranging from between about 0.1% to about 50% of the dispersion (4) by weight. As to particular embodiments, the amount of polymer (5) in the dispersion (4) can be selected from the group including or consisting of: between about 0.1% to about 10% of the dispersion (4) by weight; between about 5% to about 15% of the dispersion (4) by weight; between about 10% to about 20% of the dispersion (4) by weight; between about 15% to about 25% of the dispersion (4) by weight; between about 20% to about 30% of the dispersion (4) by weight; between about 25% to about 35% of the dispersion (4) by weight; between about 30% to about 40% of the dispersion (4) by weight; between about 35% to about 45% of the dispersion (4) by weight; and between about 40% to about 50% of the dispersion (4) by weight.

The aqueous solvent (6) can have any of a numerous and wide variety of formulations and can be in any amount which, upon combining with the amount of polymer (5), is sufficient to allow substantially uniform dispersion of the amount of polymer (5) within the formulation to provide the dispersion (4). As but one illustrative example, the aqueous solvent (6) can be water (10) and will be referred to as water (10) hereinafter for the sake of simplicity; however; the aqueous solvent (6) need not be limited to water (10). Upon combination, the amount of polymer (5) and the water (10) provide a polymer-water mixture (14).

The dispersion (4) is generated by combining an amount of gas (12) with the amount of polymer (5) and the water (10), whereby the amount of gas (12) is effective to substantially uniformly disperse the amount of polymer (5) within the water (10). As but one illustrative example, the gas (12) can be air (13) and will be referred to as air (13) hereinafter for the sake of simplicity; however, the gas (12) need not be limited to air (13).

The air (13) can be provided in the form of air bubbles (15), which can generate mixing forces capable of relatively gently mixing the amount of polymer (5) and the water (10) to substantially uniformly disperse the amount of polymer (5) within the water (10) to provide the dispersion (4). As to particular embodiments, the mixing forces generated by the air bubbles (15) can relatively gently mix the amount of polymer (5) and the water (10) to substantially uniformly disperse the amount of polymer (5) within the water (10) to provide a generally homogenous polymer-water mixture (14).

As to particular embodiments of the dispersion (4), the only mixing forces applied to the amount of polymer (5) and the water (10) to substantially uniformly disperse the amount of polymer (5) within the water (10), thereby providing the dispersion (4), can be the mixing forces generated by the air bubbles (15). Accordingly, the amount of polymer (5) and the water (10) can be mixed by forces consisting of only the mixing forces generated by the air bubbles (15), which are effective to substantially uniformly disperse the amount of polymer (5) within the water (10) to provide the dispersion (4).

The mixing forces generated by the air bubbles (15) to substantially uniformly disperse the amount of polymer (5) within the water (10), thereby providing the dispersion (4), can be relatively gentle mixing forces such that the polymeric molecules comprising the polymer (5) remain generally intact or are not damaged by the application of the mixing forces. For example, following the application of the mixing forces generated by the air bubbles (15), the molecular weight of the polymeric molecules can remain unchanged.

As to particular embodiments, the molecular weight of a percentage of the polymeric molecules which comprise the polymer (5) can remain unchanged following the application of the mixing forces generated by the air bubbles (15), whereby the percentage can be selected from the group including or consisting of: about 100% of the polymeric molecules; greater than about 99% of the polymeric molecules; greater than about 95% of the polymeric molecules; greater than about 90% of the polymeric molecules; greater than about 80% of the polymeric molecules; greater than about 70% of the polymeric molecules; greater than about 60% of the polymeric molecules; and greater than about 50% of the polymeric molecules. Thus, the mixing forces generated by the air bubbles (15) can be considered non-shearing mixing forces, which, upon application, do not shear a majority of the polymeric molecules comprising the polymer (5).

Said another way, in the present invention, the polymer (5) is not subject to shear conditions or shearing forces for substantially uniform dispersion of the amount of polymer (5) within the water (10), which is in contrast to conventional methods of mixing polymer (5) and water (10), whereby shearing forces and in particular, high shearing forces, are typically applied to disperse the polymer (5) within water (10). As but one illustrative example, conventional methods of mixing polymer (5) and water (10) may utilize an impeller including a plurality of blades to generate high shear conditions to disperse the polymer (5) within the water (10).

A method of making a dispersion (4) for use with an effluent treatment system (1) includes combining an amount of gas (12), such as air (13), with an amount of polymer (5)

and an aqueous solvent (6), such as water (10), whereby the amount of air (13) is effective to substantially uniformly disperse the amount of polymer (5) within the water (10).

Again referring primarily to FIG. 3, the amount of air (13), the amount of polymer (5), and the water (10) can be combined in a first mixing chamber (16), whereby each can be respectively provided by an air source (17), a polymer source (18), and a water source (19). As to particular embodiments, the amount of air (13) can be firstly combined with the water (10) to provide an entrained air-water mixture (20), which can be subsequently combined with the amount of polymer (5). As but one illustrative example, the amount of air (13) can be entrained in a flow of water (10) as the water (10) travels through a conduit toward the first mixing chamber (16), whereby the amount of air (13) can be provided by an atmospheric air source (17) (i.e., the atmosphere or ambient environment), a pressurized air source (17), or the like, or combinations thereof.

Again referring primarily to FIG. 3, the amount of air (13) can be firstly combined with the water (10) to provide the entrained air-water mixture (20) prior to ingress into the first mixing chamber (16). Following, the entrained air-water mixture (20) can flow into the first mixing chamber (16) for combination with the amount of polymer (5) flowing into the first mixing chamber (16) from the polymer source (18) to provide a polymer-water mixture (14).

The air (13) can be provided in the form of air bubbles (15), which can generate mixing forces capable of relatively gently mixing the amount of polymer (5) and the water (10) to substantially uniformly disperse the amount of polymer (5) within the water (10), thereby providing the dispersion (4), as described above.

The polymer (5) can be provided in fluid form for ingress into the first mixing chamber (16), for example as a fluidic polymer solution, a fluidic polymer suspension, a fluidic polymer emulsion, or combinations thereof.

Again referring primarily to FIG. 3, as to particular embodiments, the dispersion (4) can be generated following the combining of the amount of air (13) with the amount of polymer (5) and the water (10) in the first mixing chamber (16). Following, the dispersion (4) can egress from the first mixing chamber (16) for combination with effluent (3) within a dissolved air flotation system (7) to generate the float (8) comprising solids (9), water (10), and a mixture of fats, oils, and greases (11).

Again referring primarily to FIG. 3, as to other particular embodiments, following egression from the first mixing chamber (16), the polymer-water mixture (14) can ingress into a second mixing chamber (21), where the polymer-water mixture (14) can be combined with an additional entrained air-water mixture (20) to further mix the amount of polymer (5) and the water (10) to substantially uniformly disperse the amount of polymer (5) within the water (10) to provide the dispersion (4). Following, the dispersion (4) can egress from the second mixing chamber (21) for combination with effluent (3) within a dissolved air flotation system (7) to generate the float (8) comprising solids (9), water (10), and a mixture of fats, oils, and greases (11).

Again referring primarily to FIG. 3, as to yet other particular embodiments, following egression from the second mixing chamber (21), the polymer-water mixture (14) can ingress into a third mixing chamber (22), where the polymer-water mixture (14) can be combined with an additional entrained air-water mixture (20) to further mix the amount of polymer (5) and the water (10) to substantially uniformly disperse the amount of polymer (5) within the water (10) to provide the dispersion (4). Following, the dispersion (4) can egress from the third mixing chamber (22) for combination with effluent (3) within a dissolved air flotation system (7) to generate the float (8) comprising solids (9), water (10), and a mixture of fats, oils, and greases (11).

As to particular embodiments, the above-detailed process can be repeated one or more additional times, depending upon the application.

Figure 2:
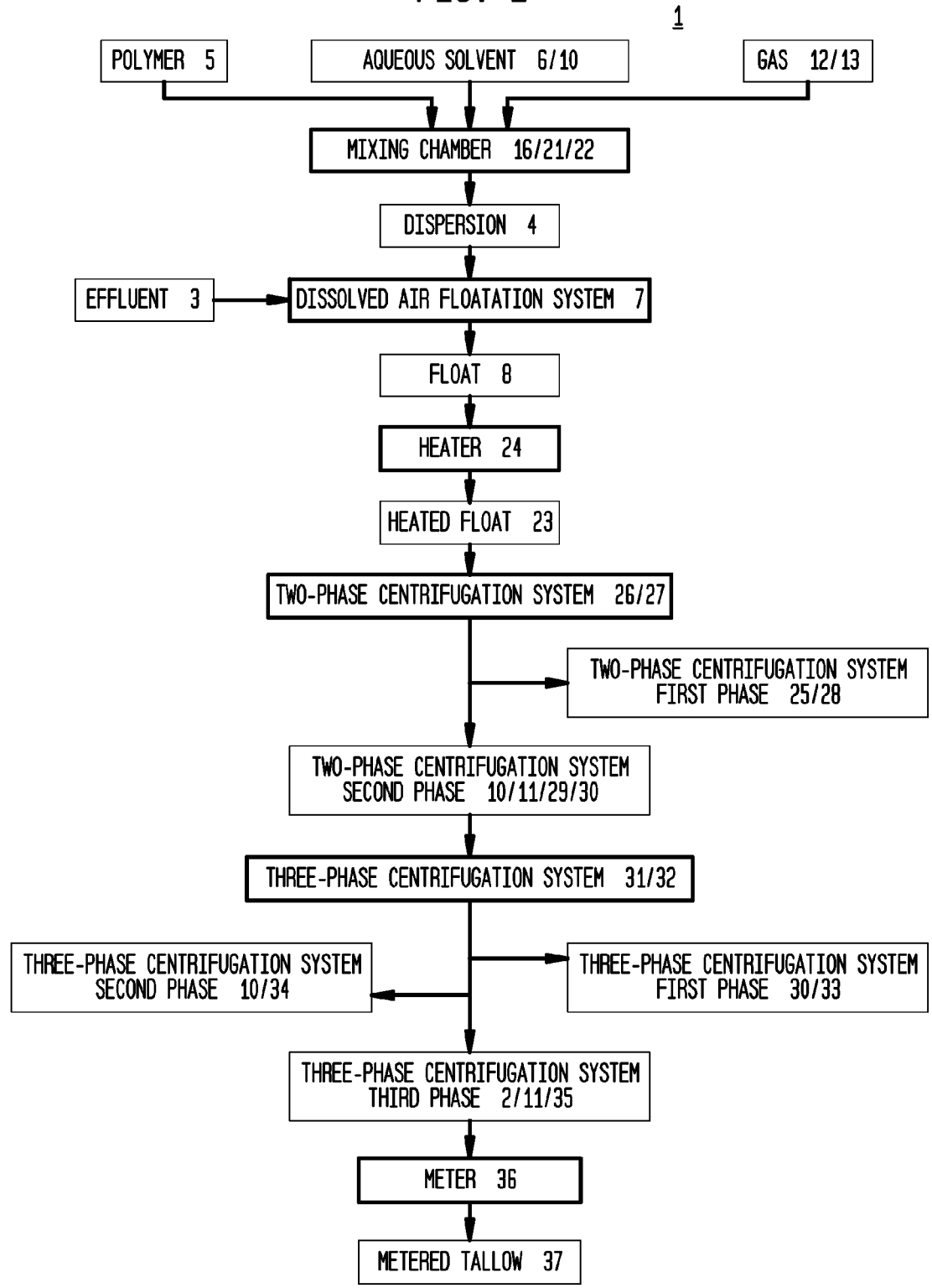
FIG. 2 is an illustration of a method of using a particular embodiment of the effluent treatment system to recover tallow from effluent.

Now referring primarily to FIG. 1 and FIG. 2, the dispersion (4) can be combined with effluent (3) within a dissolved air flotation system (7) to generate a float (8) comprising solids (9), water (10), and a mixture of fats, oils, and greases (11), whereby one of ordinary skill in the art would be familiar with the conventional means by which the float (8) is generated within the dissolved air flotation system (7). Subsequently, the float (8) can be collected, again by conventional means.

Now referring primarily to FIG. 2, the float (8) can then be heated to provide a heated float (23) which is capable of fluidic movement or flowing. As but one illustrative example, the float (8) can be pumped, for example via a rotary lobe pump, to a heater (24), for example a steam heat exchanger, which can heat the float (8) to provide the heated float (23), whereby the temperature provided by the heater (24) can be any temperature which facilitates fluidic movement or flowing of the heated float (23). As a non-limiting example, the heater (24) can provide a temperature greater than about 90 degrees Celsius (° C.), which can render the heated float (23) fluidic.

Following, the float (8) can then be subject to separation whereby the solids (9) and water (10) can be separated from the mixture of fats, oils, and greases (11) to provide tallow (2).

Again referring primarily to FIG. 2, as to particular embodiments, the float (8) can be subject to separation whereby a first amount of solids (25) can be separated from the water (10) and the mixture of fats, oils, and greases (11). As but one illustrative example, the float (8) can be separated by a first centrifugation system (26), which can, but need not necessarily, include a decanter centrifuge such as a Sharples P3400 Decanter Centrifuge, as a non-limiting example. As to particular embodiments, the decanter centrifuge can, but need not necessarily, include a variable-speed drive.

As to particular embodiments, the decanter centrifuge can, but need not necessarily, further include a composite/carbide-tipped conveyor, which is in contrast to conventional stainless steel or carbon steel conveyors. As but one non-limiting example, the composite can be epoxy, thereby providing an epoxy/carbide-tipped conveyor.

As to particular embodiments, the first centrifugation system (26) can be a two-phase centrifugation system (27) which generates a two-phase centrifugation system first phase (28) comprising or consisting of the first amount of solids (25) and a two-phase centrifugation system second phase (29) comprising or consisting of a second amount of solids (30), the water (10), and the mixture of fats, oils, and greases (11).

As to particular embodiments having a first centrifugation system (26) configured as a decanter centrifuge including a composite/carbide-tipped conveyor, the two-phase centrifugation system second phase (29) can have a greater volume than comparable phases generated upon centrifugation with a conventional three-phase centrifuge, typically including a stainless steel or carbon steel conveyor. Accordingly, the two-phase centrifugation system first phase (28) can have a lesser amount of fluid, also in comparison to a comparable phase generated upon centrifugation with a conventional three-phase centrifuge.

Again referring primarily to FIG. 2, following generation by the two-phase centrifugation system (27), the two-phase centrifugation system second phase (29) can then be subject to separation whereby the second amount of solids (30) and the water (10) can separated from the mixture of fats, oils, and greases (11) to provide tallow (2). As but one illustrative example, the two-phase centrifugation system second phase (29) can be separated by a second centrifugation system (31), which can, but need not necessarily, include a disk stack centrifuge such as Westfalia SA-40-03-177 Disc Centrifuge, as a non-limiting example.

As to particular embodiments, the second centrifugation system (31) can be a three-phase centrifugation system (32) which generates a three-phase centrifugation system first phase (33) comprising or consisting of the second amount of solids (30), a three-phase centrifugation system second phase (34) comprising or consisting of the water (10), and a three-phase centrifugation system third phase (35) comprising or consisting of the mixture of fats, oils, and greases (11) which provide tallow (2).

Again referring primarily to FIG. 2, as to particular embodiments, following recovery of the tallow (2) from the effluent (3), the tallow (2) can then be subject to metering by a meter (36) to provide metered tallow (37).

The quality of the tallow (2) recovered from effluent (3) using the instant effluent treatment system (1) can correspond to the specifications contained in Rule 7 of the Rules of the American Fats and Oils Association for the Animal Tallow and Grease—(Domestic Contract), whereby the Standard Grade Specification and Quality Tolerances for Tallows and Greases are set forth in Table 1 as follows:

TABLE 1

| Grade | Titer Minimum | F.F.A. Maximum | F.A.C. Maximum | R&B Color Maximum | M.I.U. Maximum |
|---|---|---|---|---|---|
| Edible Tallow | 41.0 | 0.75 | 3 | none | * |
| Lard (Edible) | 38.0 | 0.50 | ** | none | * |
| Top White Tallow | 41.0 | 2 | 5 | 0.5 | 1 |
| All Beef Packer Tallow | 42.0 | 2 | none | 0.5 | 1 |
| Extra Fancy Tallow | 41.0 | 3 | 5 | none | 1 |
| Fancy Tallow | 40.5 | 4 | 7 | none | 1 |
| Bleachable Fancy Tallow | 40.5 | 4 | none | 1.5 | 1 |
| Prime Tallow | 40.5 | 6 | 13-11B | none | 1 |
| Special Tallow | 40.0 | 10 | 21 | none | 1 |
| No. 2 Tallow | 40.0 | 35 | none | none | 2 |
| "A" Tallow | 39.0 | 15 | 39 | none | 2 |
| Choice White Grease | 36.0 | 4 | 13-11B | none | 1 |
| Yellow Grease | *** | **** | 39 | none | 2 |

Titer: The titer determines the solidification point of fatty acids; reported in degrees Celsius (° C.).
F.F.A.: Stands for free fatty acids; reported in percentage of oleic acid.
F.A.C.: Stands for Fat Analysis Committee, which is a method that determines the color of fats and oils by comparison with AOCS FAC color standards.
R&B Color: Stands for refining and bleaching color, which is the color after refining and bleaching; reported in terms of red on a 5 ¼ inch cell or tube of AOCS methods.
M.E.K.: a peroxide value expressed in milli equivalents per kilo; measure of fat oxidation.
M.I.U.: group of tests including (M) moisture and volatile matter, (I) insoluble impurities, and (U) unsaponifiable matter; reported as percentages; measure of the amount of non-fatty matter present.
* Moisture maximum 0.20%. Insoluble impurities maximum 0.05%.
** Lovibond Color 5 ¼ inch cell-Max. 1.5 Red. Lard Peroxide Value 4.0 M.E.K. Max.
*** Titer minimum, when required, to be negotiated between buyer and seller on a contract by contract basis.
**** F.F.A. maximum, when required, to be negotiated between buyer and seller on a contract by contract basis.

As to particular embodiments, the quality tolerances of the tallow (2) recovered from effluent (3) using the instant effluent treatment system (1) can correspond to the quality tolerances of one or more tallows or greases specified in Table 1.

As to particular embodiments, the quality tolerances of the tallow (2) recovered from effluent (3) using the instant effluent treatment system (1) can correspond to the quality tolerances of Inedible Bleachable Packer Tallow, which includes a titer minimum of at least about 40-42 degrees Celsius, a F.F.A. maximum of less than about 5%, and an M.I.U. maximum of less than about 1%.

Now referring primarily to Table 2, six samples of tallow (2) independently recovered from effluent (3) using the instant effluent treatment system (1) were analyzed to determine values for the quality tolerance listed in Table 1. On average, tallow (2) recovered from effluent (3) using the instant effluent treatment system (1) had a titer minimum of about 41 degrees Celsius, an F.F.A. maximum of about 1.7%, an F.A.C. maximum of none, an R&B color maximum of none, and an M.I.U. maximum of 0.97%.

TABLE 2

| Sample | Titer Minimum | F.F.A. Maximum | F.A.C. Maximum | R&B Color Maximum | M.I.U. Maximum | Protein |
| --- | --- | --- | --- | --- | --- | --- |
| A | 41.5 | 1.5 | none | none | 0.970 | <50% |
| B | 41.0 | 1.3 | none | none | 0.964 | <50% |
| C | 41.2 | 1.9 | none | none | 0.988 | <50% |
| D | 40.0 | 1.8 | none | none | 0.980 | <50% |
| E | 40.2 | 1.5 | none | none | 0.933 | <50% |
| F | 41 | 2 | none | none | 0.980 | <50% |

As to particular embodiments, the tallow (2) recovered from effluent (3) using the instant effluent treatment system (1) can have a moisture maximum of less than about 2%, whereby the moisture maximum can be selected from the group including or consisting of: less than about 2%; less than about 1.75%; less than about 1.5%; less than about 1.25%; less than about 1%; less than about 0.9%; and less than about 0.8%. As but one illustrative example, the tallow (2) recovered from effluent (3) using the instant effluent treatment system (1) can have a moisture maximum of less than about 0.8%, which is 60% lesser than a moisture maximum of 2%.

As to particular embodiments, recovery of tallow (2) when using the instant effluent treatment system (1) can take a lesser amount of time than recovery of tallow (2) using conventional tallow recovery processes, in which the dwell time can be greater than one day. As but one illustrative example, when using the instant effluent treatment system (1), the float (8) can be separated to generate tallow (2) in a time period of less than about four minutes. As to particular embodiments, when using the instant effluent treatment system (1), the float (8) can be separated to generate tallow (2) in a time period of less than about 3.8 minutes.

As to particular embodiments, the tallow (2) recovered with the instant effluent treatment system (1) can have a temperature greater than about 90 degrees Celsius. Accordingly, the tallow (2) can be substantially fluidic and thus, does not require additional heating for transfer to a storage container.

As to particular embodiments, the effluent treatment system (1) can be a portable effluent treatment system which can be within a portable housing, whereby the housing can, but need not necessarily, be coupled to wheels.

For the purposes of the present invention, the term "portable" means capable of being moved about relatively easily, for example because of being lighter, smaller, or both, relative to a conventional version.

The portable effluent treatment system (1) for recovering tallow (2) from effluent (3) includes a mixing chamber in which a dispersion (4) can be generated, the dispersion (4) comprising an amount of polymer (5) substantially uniformly dispersed within an aqueous solvent (6); and a dissolved air flotation system (7) in fluidic communication with the mixing chamber; whereby in the dissolved air flotation system (7), the dispersion (4) can be combined with the effluent (3) to generate a float (8) comprising solids (9), water (10), and a mixture of fats, oils, and greases (11).

As to particular embodiments, the mixing chamber can, but need not necessarily, include first, second, and third mixing chambers (16)(21)(22), whereby each of the first and third mixing chambers (16)(22) can be in fluidic communication with the second mixing chamber (21).

The portable effluent treatment system (1) can, but need not necessarily, further include a heater (24) in fluidic communication with the dissolved air flotation system (7); whereby in the heater (24), the float (8) can be heated to provide heated float (23).

The portable effluent treatment system (1) can, but need not necessarily, further include a separation system in fluidic communication with the heater (24); whereby in the separation system, the solids (9) and the water (10) can be separated from the mixture of fats, oils, and greases (11) to provide the tallow (2).

As to particular embodiments, the separation system can, but need not necessarily, include a two-phase centrifugation system (27) in fluidic communication with the heater (24; whereby, in the two-phase centrifugation system (27), a first amount of the solids (25) can be separated from a second amount of solids (30), the water (10), and the mixture of fats, oils, and greases (11).

As to particular embodiments, the separation system can, but need not necessarily, further include a three-phase centrifugation system (32) in fluidic communication with the two-phase centrifugation system (27); whereby in the three-phase centrifugation system (27), the second amount of solids (30) and the water (10) can be separated from the mixture of fats, oils, and greases (11) to provide the tallow (2).

The portable effluent treatment system (1) can, but need not necessarily, further include a meter (36) in fluidic communication with the three-phase centrifugation system (27); whereby in the meter (36), the tallow (2) can be metered to provide metered tallow (37).

As can be easily understood from the foregoing, the basic concepts of the present invention may be embodied in a variety of ways. The invention involves numerous and varied embodiments of an effluent treatment system and methods for making and using such an effluent treatment system, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "mixture" should be understood to encompass disclosure of the act of "mixing"—whether explicitly discussed or not—and, conversely, were there effectively disclosure of the act of "mixing", such a disclosure should be understood to encompass disclosure of a "mixture" and even a "means for mixing". Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the effluent treatment systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A method of recovering tallow from effluent, comprising:
   providing a dispersion resulting from:
   (i) firstly combining an amount of gas with an aqueous solvent to provide an entrained gas-aqueous solvent mixture;
   (ii) subsequently combining said entrained gas-aqueous solvent mixture with an amount of polymer; and
   (iii) mixing said amount of polymer and said entrained gas-aqueous solvent mixture by applying forces consisting of mixing forces generated by said gas in the form of gas bubbles;
   wherein said mixing forces are effective to substantially uniformly disperse said amount of polymer within said aqueous solvent;
   combining said dispersion with said effluent to generate a float comprising said tallow; and
   recovering said tallow from said float.

2. The method of claim 1, further comprising providing said amount of polymer in a range of between about 0.1% to about 50% of said dispersion by weight.

3. The method of claim 1, further comprising providing said aqueous solvent as water.

4. The method of claim 3, further comprising providing said gas as air.

5. The method of claim 4, further comprising providing said air as air bubbles.

6. The method of claim 3, further comprising substantially uniformly dispersing said amount of polymer within said water to provide a generally homogenous polymer-water mixture.

7. The method of claim 5, wherein upon application of said mixing forces generated by said air bubbles, the molecular weight of polymeric molecules which comprise said polymer remains unchanged.

8. The method of claim 1, further comprising providing said polymer in fluid form.

9. A method of recovering tallow from effluent, comprising:
    providing a dispersion resulting from:
        (i) firstly combining an amount of gas with an aqueous solvent to provide an entrained gas-aqueous solvent mixture;
        (ii) subsequently combining said entrained gas-aqueous solvent mixture with an amount of polymer; and
        (iii) mixing said amount of polymer and said entrained gas-aqueous solvent mixture by applying forces comprising mixing forces generated by said gas in the form of gas bubbles;
        wherein said mixing forces are effective to substantially uniformly disperse said amount of polymer within said aqueous solvent;
    combining said dispersion with said effluent to generate a float comprising said tallow; and
    recovering said tallow from said float.

10. The method of claim 9, further comprising combining said dispersion with said effluent within a dissolved air flotation system to generate said float comprising solids, water, and a mixture of fats, oils, and greases.

11. The method of claim 10, further comprising heating said float.

12. The method of claim 11, further comprising separating a first amount of said solids from a second amount of said solids, said water, and said mixture of fats, oils, and greases with a two-phase centrifugation system.

13. The method of claim 12, further comprising separating said second amount of said solids and said water from said mixture of fats, oils, and greases with a three-phase centrifugation system.

14. The method of claim 9, wherein the quality tolerances of said tallow corresponds to Inedible Bleachable Packer Tallow.

15. The method of claim 9, wherein said tallow has a titer minimum of at least about 40 degrees Celsius.

16. The method of claim 9, wherein said tallow has a free fatty acid maximum of less than about 5% oleic acid.

17. The method of claim 9, wherein said tallow has an M.I.U. maximum of less than about 1%.

18. The method of claim 9, wherein said tallow has a moisture maximum of less than about 2%.

19. The method of claim 9, wherein said float is separated to generate said tallow in a time period of less than about four minutes.

20. A method of separating effluent into solids, water, and a mixture of fats, oils, and greases, comprising:
    providing a dispersion resulting from:
        (i) firstly combining an amount of gas with an aqueous solvent to provide an entrained gas-aqueous solvent mixture;
        (ii) subsequently combining said entrained gas-aqueous solvent mixture with an amount of polymer; and
        (iii) mixing said amount of polymer and said entrained gas-aqueous solvent mixture by applying forces consisting of mixing forces generated by said gas in the form of gas bubbles;
        wherein said mixing forces are effective to substantially uniformly disperse said amount of polymer within said aqueous solvent;
    combining said dispersion with said effluent to generate a float comprising said solids, said water, and said mixture of fats, oils, and greases; and
    separating said mixture of fats, oils, and greases from said solids and said water.

* * * * *